May 17, 1949.  R. J. BITNER  2,470,134
TEMPERATURE CONTROLLED OVEN FOR DUAL QUARTZ CRYSTALS
Filed Dec. 16, 1946

INVENTOR.
Robert J. Bitner
BY
ATTORNEY.

UNITED STATES PATENT OFFICE 2,470,134

TEMPERATURE CONTROLLED OVEN FOR DUAL QUARTZ CRYSTALS

Robert J. Bitner, Kansas City, Mo., assignor to Gasket Engineering Co., Inc., Kansas City, Mo., a corporation of Missouri Application December 16, 1946, Serial No. 716,502

6 Claims. (Cl. 171—327)

This invention relates to the art of electronics and pertains particularly to crystal holders and means for maintaining an even temperature in and about the said crystals as the same are operatively supported in an electrical circuit with which the same are employed.

The primary aim of the invention is to provide a temperature controlled oven for crystals of quartz or analogous type which oven is automatically maintained at an even temperature while the crystals are held in place, to the end that operation of said crystals may not be effected by unavoidable atmospheric temperature changes to which the apparatus is subjected during normal use.

One of the most important objects of this invention is the provision of means for carrying one or more crystals in an operative position where the same may be utilized in a normal manner yet where the temperature of the crystal or crystals and the air surrounding the same is maintained at a desired level, all without manual control or demanding the attention of the operator.

Yet further aims of this invention are to provide a temperature controlled oven for crystals employed in radio circuits or the like, which oven includes a novel and unique group of parts permitting the assembly and disassembly of the said group without use of tools; to provide heating means for the crystals of the oven that will effectively maintain the temperature of the space within which the crystals are confined at a predetermined level regardless of atmospheric temperature changes; to provide a unique thermostatic control for the heating element of the oven that will make and break a circuit supplying energy to the heating coil; to provide means for maintaining more than one crystal at a desired temperature, which temperature is common to both crystals for the purpose of insuring like operation thereof when the crystals are a part of a single electrical radio circuit; to provide parts that may be renewed and interchanged with speed and dispatch when any one of the parts becomes defective; and to provide a compact assembly capable of renewably supporting a pair of crystals either of which may be changed without the use of tools and without distructive forces being exerted upon any of the component parts of the oven.

A large number of objects in addition to those above set down will appear during the course of the following specification referring to the accompanying drawing, wherein Fig. 1 is a side elevational view of a temperature controlled oven for dual quartz crystals made in accordance with the present invention.

Figure 1:
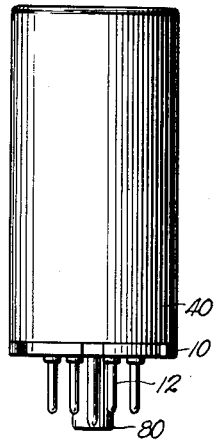
Figure 2:
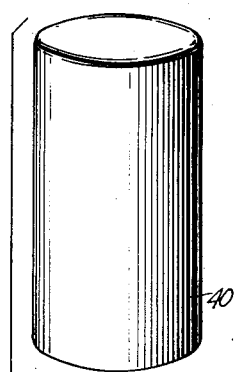
Fig. 2 is a stretched-out perspective view of the component parts of the oven.
Figure 5:
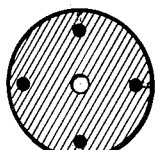
Fig. 5 is a cross-sectional view taken on line V—V of Fig. 4.
Figure 3:
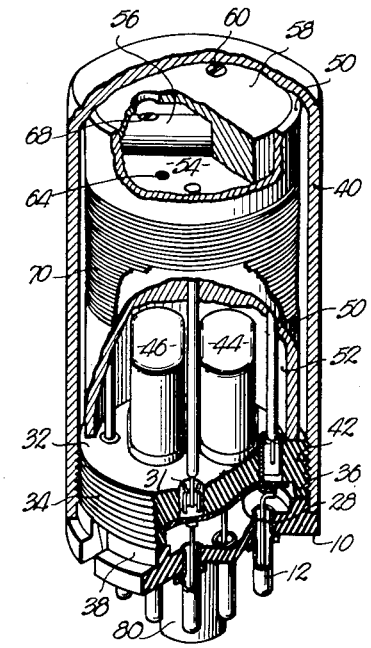
Fig. 3 is a fragmentary perspective and partial sectional view of the oven with the parts thereof in an assembled condition.
Figure 4:
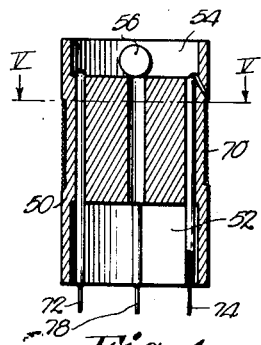
Fig. 4 is a central longitudinal sectional view through the heating core taken on line IV—IV of Fig. 2.
Figure 7:
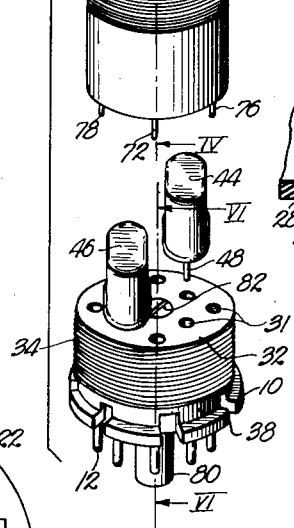
Fig. 7 is a fragmentary perspective view of one of the several clips on the base of the oven.
Figure 7:
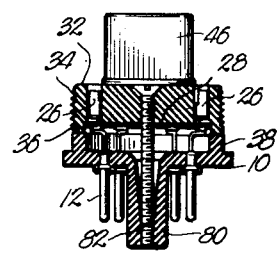

It will be conceivable to one skilled in the art on viewing the accompanying drawing and reading the following specification that the oven embodying the concepts and object of the invention may be made to present a number of different physical characteristics. The form of the oven chosen for illustration is, therefore, typical and comprises a base 10 and includes a number of hollow prongs 12, 14, 16, 18, 20, 22, 24 and 25 respectively, the character whereof is as illustrated in Fig. 3. These prongs each carry a contact finger of identical nature and these contact fingers form a component part of each prong 12, 14, 16, 18, 20, 22, 24 and 25 respectively, in that one end of the said contact fingers of the prongs is soldered into the hollow prong, while the opposite or upper end thereof is secured to a clip 26, having the form illustrated in Fig. 7.

There is a clip for each prong and a clip holding plate 28 is perforated as at 30 which serves to maintain the clips 26 in position for reception by perforations 31 in plug 32. This plug 32, as well as plate 28, is of non-conducting material and in practice the plate has been formed of sheet fiber, while the plug is molded or otherwise constructed of Bakelite or analogous material. Plug 32 has screw threads 34 on the exterior wall thereof and since plug 32 is disc-shaped, the size of the same controls generally the dimensions of the remaining parts of the oven. Plug 32 is provided with a cavity in the normally lower face thereof to receive plate 28, as the several clips 26 enter the perforations 30. This relation between parts is clearly illustrated in Fig. 3, where an annular flange 36 of plug 32 rests upon an opposing flange 38 on base 10. This base 10 is slightly larger in outside diameter than the similar diameter of plug 32 and flange 38 is spaced inwardly from the outer annular edge of base 10. Thus a shoulder of L-shaped cross-sectional contour is created on the edge of base 10 to receive the lower edge of a cup-shaped cover 40 formed of metal such as aluminum, brass or other desirable substances. This cover 40 has internal threads 42 cooperating with external threads 34 of plug 32 and when the cover is in place, it fits against the L-shaped shoulder on base 10, as clearly shown in Fig. 3.

Prongs 14 and 25 are in connection with one of the two crystals 44 and 46 respectively through the contact fingers and clips associated with said prongs 14 and 25, and the crystal 46 is in connection with prongs 18 and 22 through the medium of the contact fingers and clips 26 associated with these said prongs. Each of said crystals 44 and 46 has a pair of pins 48 thereon to enter clips 26 connected to the prongs to which the crystals 44 and 46 is easy because prongs 48 have a slip and frictional engagement with clips 26 and replacement may be accomplished with a minimum amount of time.

A specially formed core molded or otherwise produced from aluminum or such substances as will be analogous to aluminum as regards high heat conductivety, includes a core body 50 of substantially cylindrical shape with a cavity 52 in one end thereof to accommodate crystals 44 and 46, as illustrated in Fig. 3 and another cavity 54 in the opposite end of body 50 to receive a thermostat 56. This thermostat is held in a confined position by filler block 58 that straddles thermostat 56 and insures positive operation of the thermostat because the upper portion of body 50 is substantially a solid mass of material when the thermostat is so disposed. Block 58 is held in position by screws 60 that pass through openings 62 in the block and thence to tapped sockets 64 in body 50. An access hole 66 provided in filler block 58 permits the operator to adjust thermostat 56 by manipulating adjusting screw 68 when cover 40 is removed. The temperature at which crystals 44 and 46 is maintained is thereby established. A heating coil 70 of resistance wire wound around a slightly offset annular area on the outer periphery of body 50, constitutes the heating means for the oven and, of course, the coil is insulated thoroughly from body 50 and connected to prongs 20 and 24 through the medium of posts 72 and 74, having their lower ends projected beyond the end of body 50, and gripped by clips 26 associated with prongs 20 and 24 when body 50 is mounted upon perforated plug 32. Coil 70 has one end joined to prong 20 through post 72 while the other end of coil 70 is joined to prong 24 through post 74, which post is also joined to one end of thermostat 56. The other end of thermostat 56 is joined to prong 16 through post 76. Post 78 is a guard post and is joined to prong 12.

Prong 24 has been supplied for the application of an external signal to inform the operator when the thermostat is in or out of operation when such a signal is employed, connection is made to this prong 24 and to prong 20. These prongs are also used when setting the thermostat at the time the oven is manufactured.

The desirable temperature to maintain is 75 degrees C at the crystals 44 and 46.

Figure 6:
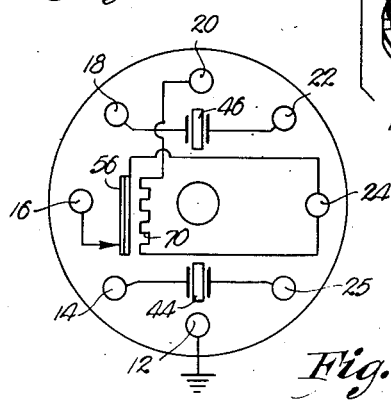
Fig. 6 is a sectional view through the base of the oven taken on line VI—VI of Fig. 2.
Figure 8:
Fig. 8 is a wiring diagram, illustrating the manner of electrically connecting the component parts of the temperature controlled oven to the prongs of the device whereby the same is operably mounted.

Coil 70 encircles body 50 at a point between cavities 52 and 54 and where the body is solid throughout its cross-sectional area. The mass of material absorbs heat from coil 70 and radiates the same into cavity 52 to maintain crystals 44 and 46 at the temperature determined by the setting of thermostat 56. The pair of posts 76 and 74 in connection with thermostat 56, allows the thermostat to open and close the circuit to coil 70 through the connections shown schematically in Fig. 8. When the temperature of body 50 and, therefore, cavity 52 and crystals 44 and 46 drops below a point determined, said thermostat 56 will close the circuit to coil 70 and energize the same for the purpose of imparting heat to body 50 and all parts associated therewith. When the temperature is raised by such heating action, the thermostat will automatically open the circuit to coil 70 to prevent further heating. A guide plug 80, integral with base 10, is of conventional character and when plug 32 is moved to position with clips 26 in the appropriate perforations 30 of this plug 32, an anchoring screw 82, is fastened in place to hold base and plug 10 and 32 respectively in the condition shown in Fig. 6. This plug 80 is internally threaded near the outer or free end thereof to cooperate with screw 82.

From the foregoing it will be apparent that two crystals 44 and 46 will be maintained at an even temperature during use and that the oven may be kept in operative condition through the medium of easily replaceable parts, none of which require special tools during the assembling and disassembling operation. An extremely compact oven results from the employment of parts above specified and the unit has been proven in actual practice to be highly useful and desirable, in operation, efficiency and utility, and, therefore, has fulfilled a problem long existing in the electronic art of properly supporting dual quartz crystals and maintaining an even temperature therein.

Having thus described the invention, what is claimed as new and desired to be secured by Letters Patent is:

1. In a temperature controlled oven for crystals, a base having prongs thereon for mounting the oven in a supporting socket having appropriate electrical operating connections; a core having a cavity in each end thereof; a crystal on the base and in one of the cavities; a thermostat in the other cavity; and a heating coil wound on the said core.

2. In a temperature controlled oven for crystals, a base having prongs thereon for mounting the oven in a supporting socket having appropriate electrical operating connections; a core having a cavity in each end thereof; a crystal on the base and in one of the cavities; a thermostat in the other cavity; a heating coil wound on the said core, said base comprising a plate having the prongs carried thereby, and a plug superimposed on the plate having a number of clips thereon in opposed relation respectively with the prongs on the plate, said prongs each having a contact finger joining the same with their respective opposed clips.

3. In a temperature controlled oven for crystals, a base having prongs thereon for mounting the oven in a supporting socket having appropriate electrical operating connections; a core having a cavity in each end thereof; a crystal on the base and in one of the cavities; a thermostat in the other cavity; a heating coil wound on the said core; and a cover encasing the core and removably affixed to the said base.

4. In a temperature controlled oven for crystals, a sectional base having prongs on one section thereof for mounting the oven in a supporting socket provided with appropriate electrical operating connections; clips on another section of the base; means for securing together the sections of said base with the clips in electrical contact with the prongs; a hollow core on the base; a heating coil carried by the core; a thermostat mounted on the core; posts on the core having connection with the coil and the thermostat and adapted to engage certain of the clips when the core is in place on the base; a crystal on the base and confined within the hollow core, said crystal having slip connection with certain other of the clips on the base; and a cover for the core and in quickly releasably connection with the base.

5. In a temperature controlled oven for crystals, a base having prongs thereon for mounting the oven in a supporting socket having approporiate electrical operating connections; a core having a cavity in each end thereof; a crystal on the base and in one of the cavities; a thermostat in the other cavity; and a heating coil wound on the said core, said core being formed of material having high heat conductivity, the said heating coil being wound around the core on a solid partition thereof intermediate the cavities therein.

6. In a temperature controlled oven for crystals, a sectional base having prongs on one section thereof for mounting the oven in a supporting socket provided with appropriate electrical operating connections; clips on another section of the base; means for securing together the sections of said base with the clips in electrical contact with the prongs; a hollow core on the base; a heating coil carried by the core; a thermostat mounted on the core; posts on the core having connection with the coil and the thermostat and adapted to engage certain of the clips when the core is in place on the base; a crystal on the base and confined within the hollow core, said crystal having slip connection with certain other of the clips on the base; and a cover for the core and in quickly releasable connection with the base, said core having a partition of appreciable thickness between the crystal and said thermostat, the said coil being wound around the core and having a length substantially equal to the thickness of the partition and in opposed relation therewith to form a heat holding mass adjacent to the crystal and the thermostat.

ROBERT J. BITNER.

REFERENCES CITED

The following references are of record in the file of this patent:

UNITED STATES PATENTS

| Number | Name | Date |
| --- | --- | --- |
| 2,102,783 | Bokovoy | Dec. 21, 1937 |
| 2,203,545 | Peterson | June 4, 1940 |
| 2,272,711 | Klein | Feb. 17, 1942 |